Figure 1:
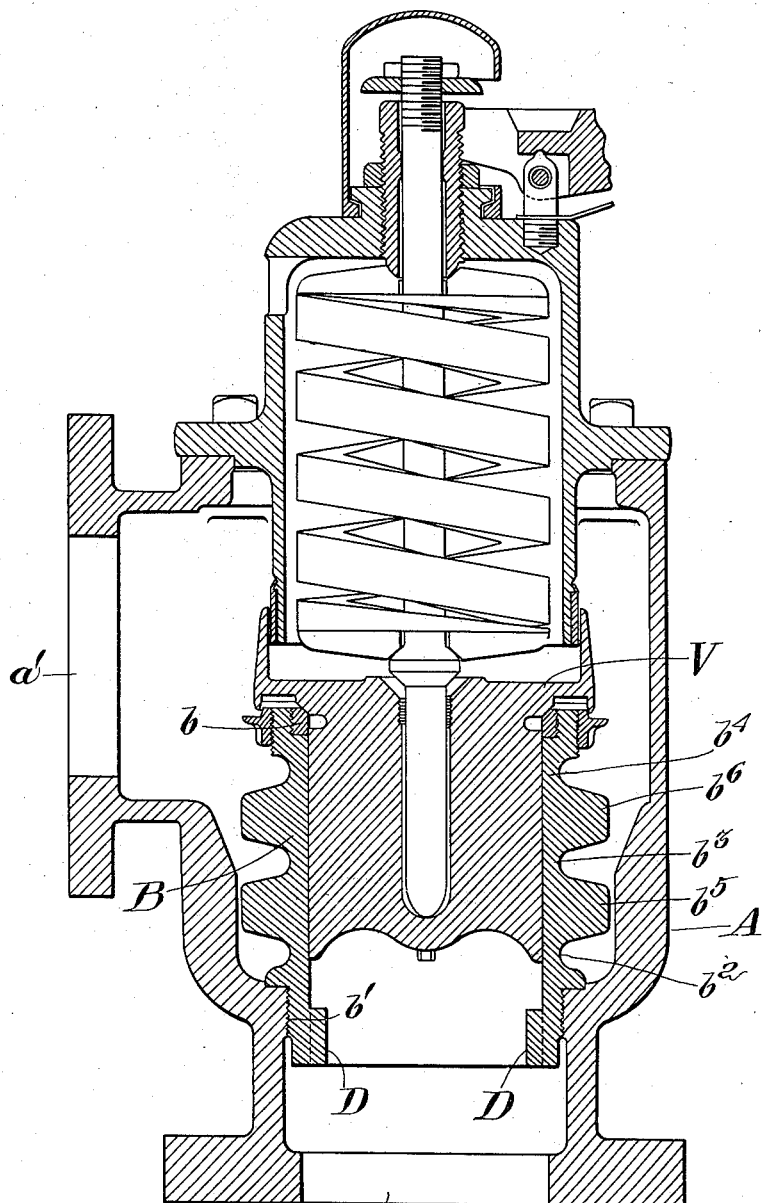

F. C. BLANCHARD & E. B. CROCKER.
SAFETY VALVE.
APPLICATION FILED AUG. 20, 1914.

1,143,027.

Patented June 15, 1915.
2 SHEETS—SHEET 1.

F. C. BLANCHARD & E. B. CROCKER.
SAFETY VALVE.
APPLICATION FILED AUG. 20, 1914.

1,143,027.

Patented June 15, 1915.
2 SHEETS—SHEET 2.

Witnesses:
Josephine H. Ryan
Richard W. Hall

Inventors:
Frederick C. Blanchard,
Ernest B. Crocker,
by Roberts, Roberts & Cushman
Attorneys.

UNITED STATES PATENT OFFICE.

FREDERICK C. BLANCHARD AND ERNEST B. CROCKER, OF BRIDGEPORT, CONNECTICUT, ASSIGNORS TO THE CONSOLIDATED SAFETY VALVE COMPANY, OF BRIDGEPORT, CONNECTICUT, A CORPORATION OF CONNECTICUT.

SAFETY-VALVE.

1,143,027.   Specification of Letters Patent.   Patented June 15, 1915.

Application filed August 20, 1914. Serial No. 857,762.

*To all whom it may concern:*

Be it known that we, FREDERICK C. BLANCHARD and ERNEST B. CROCKER, citizens of the United States, and residents of Bridgeport, in the county of Fairfield and State of Connecticut, have invented new and useful Improvements in Safety-Valves, of which the following is a specification.

This invention relates to safety valves such as are used on steam boilers, and its principal object is to provide means whereby distortions of the valve body or casing, due to various causes, are prevented from being transmitted to the valve seat.

In safety valves as heretofore constructed, without such provision, considerable difficulty has been experienced in bringing and keeping the valve seat to a true circle, which is necessary in order to insure a tight valve. When the valve body is subjected to pressure and heat the expansion of the metal in various directions distorts the valve body; other distortions result from the heavy systems of exhaust piping, which are often connected to and supported by the valve body, and which throw a good deal of weight and strain on the valve body, especially when connected to an exhaust passage at the side of the valve body; and further, any irregularities in the joint between the valve body and its connection to the boiler are an additional source of distortion of the valve body. These body distortions are all transmitted to an appreciable extent to the valve seat and tend to throw the seat out of true to a greater or less extent.

The chief object of the present invention is to prevent such distortions from affecting the valve seat, and to this end we interpose between the valve body and the valve seat, an element adapted to absorb or dissipate such distortions and prevent their reaching and distorting the valve seat.

A further object of the invention is to facilitate repair of the valve by making a removable seat bushing of novel construction, which enables a man to repair or grind the valve seat without removing the valve body or disconnecting the exhaust piping, and without attempting to do the work on the boiler, which makes it necessary often to work in a very cramped, inaccessible and hot situation.

These and other features will hereinafter be more fully described and particularly pointed out in the claims.

While the invention possesses marked advantages in single valves, it possesses even greater advantages in duplex and triplex valves for the reason that the body distortions, and also the difficulties of repair, are greater in multiplex valves than in single valves. We will therefore illustrate the invention as applied both to a single valve and to a triplex valve.

Figure 2:
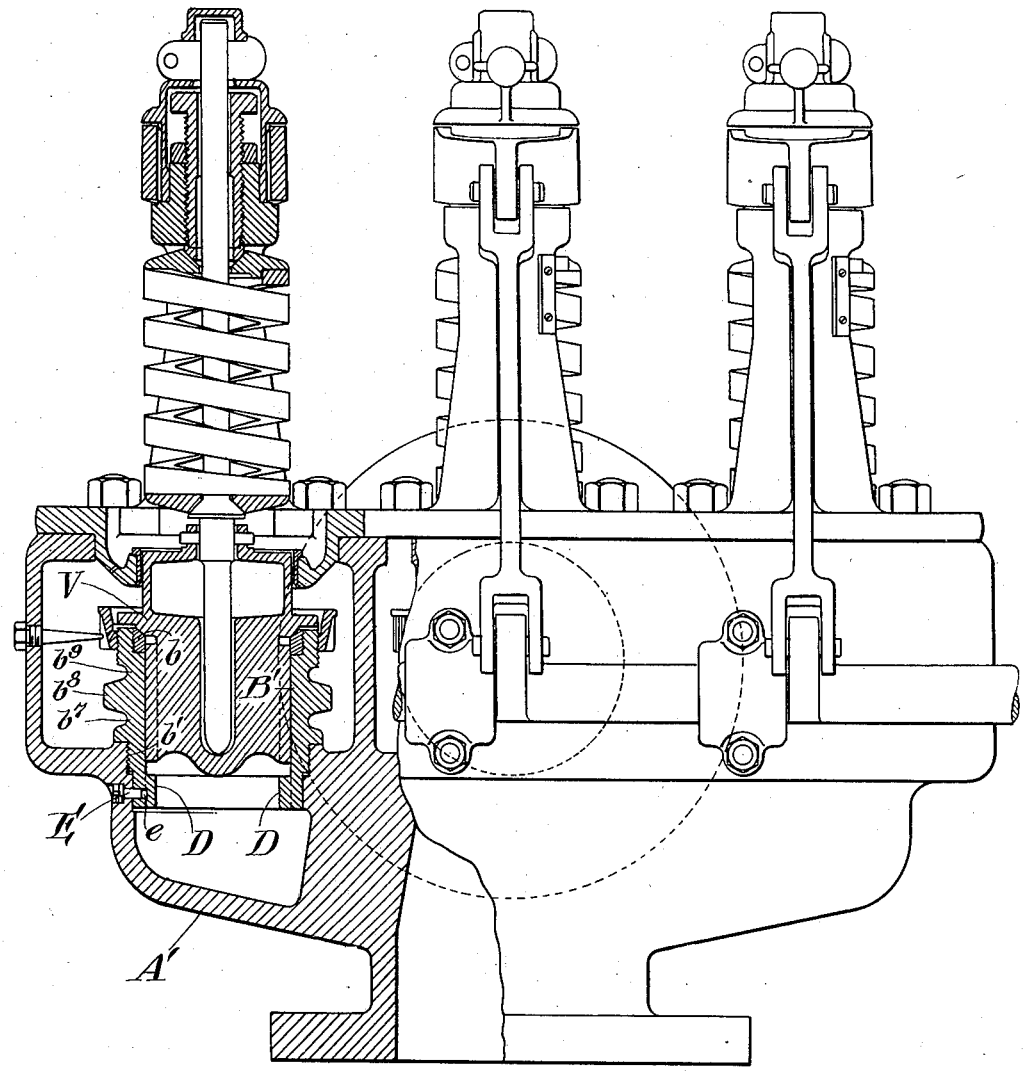
Figure 3:
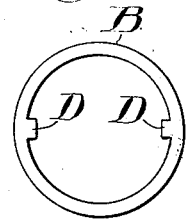

In the accompanying drawings,—Figure 1 is a vertical section of a single safety valve embodying the invention; Fig. 2 is a vertical section of a triplex safety valve embodying the invention; and Fig. 3 is a bottom end view of the removable seat bushing.

Referring first to Fig. 1, A is the base casting of the valve body, having the inlet passage $a$ and exhaust passage $a'$.

B is the seat bushing interiorly cylindrical and therefore unyielding to the valve spring pressure and having a suitable valve seat $b$ at its upper end, and screw threaded at its lower end $b'$ to fit a correspondingly screw threaded area in the body casting A.

The seat bushing B is materially elongated and is formed, between the valve seat $b$ and the point of connection $b'$ to the valve casing, with more than one relatively weak and yielding section, and one or more reinforced and relatively stiff and unyielding sections. Such thin, yielding sections are formed by the circumferential grooves $b^2$, $b^3$ and $b^4$, separated by the alternately disposed stiff sections consisting of the circumferential reinforcing belts $b^5$ and $b^6$.

Distortions in the body casting A, which are transmitted to the seat bushing B at their point of union $b'$, are to a certain extent absorbed and dissipated by the weak or yielding section $b^2$. Such distortions as pass section $b^2$ and reach stiff section $b^5$ are wholly or partly resisted and nullified by said reinforced section $b^5$. If, however, the distortions affect and pass section $b^5$, they are further absorbed by the weak or yielding section $b^3$, and so on through the alternate yielding and stiff sections until all distortions have been absorbed and dissipated before reaching the valve seat.

In the valve shown in Fig. 1 there are three yielding sections and two stiff sections; it is to be understood however that the exact number of such alternate weak and stiff sections is not essential, but may be varied according to the requirements of any given structure.

In Fig. 2 showing a triplex safety valve the seat bushing B' is provided with two yielding sections, $b^7$ and $b^9$, separated by a single reinforced section $b^8$. There are three similar seat bushings B' screwed into the triplex valve body A'. Thus each valve seat is independently protected against the distortions of the valve body, which are exceedingly irregular and complex in a multiplex valve.

As the valve proper V, its stem and operating spring, and other parts of the structure form no part of the present invention they need not be further described.

Each seat bushing B or B', being screwed into the valve body at $b'$, is removable, thereby facilitating repair work on the valve, particularly in the case of duplex or triplex valves. As it takes several hours to get steam off a boiler and to bring it up again, and as the valves are often in a cramped and hot situation, it is very difficult to repair one of these valves in place on a boiler, and in addition to the difficulties of environment it requires special tools and expert skill and knowledge of the work.

Furthermore, the combination of the distortion absorbing and dissipating features with the removable seat bushing, is highly important, because without such distortion absorbing features in the removable seat bushing itself it would be wellnigh impossible to grind a feather and seat together on the bench and then screw the bushing into the valve base and have the seat come tight. In a plain seat bushing without means to prevent distortions from affecting the seat, the slight irregularities and imperfections in the thread, even when the thread cutting is of high quality, are sufficient to throw the seat out of true when the seat bushing is screwed into the valve body hard and tight enough to insure a permanent and tight joint. Such irregularities require the seat to be reground, and often machined and reground after it has been put in place, in order to avoid leakage. To perform such repairs to the best advantage it is essential that all the grinding be done on the bench ready to assemble, and that the parts make tight fit when they are put in place without requiring further work on them. This cannot be accomplished without the use of our combined distortion absorbing and removable features. Hence the advantage of making the valve seat bushing not only removable but of providing it with sections adapted to prevent distortions from being transmitted to the seat itself, when the bushing is screwed into the valve body. At the lower end of said bushing operating lugs D, cast integral with the bushing, are provided, and by applying an appropriate wrench to these lugs the bushing may be screwed down tight into the valve body, or unscrewed for removal. The bushing is prevented from backing out by a locking screw E, which extends through a hole in the valve body and into a socket $e$ in the bushing (Fig. 2).

We claim:

1. In a safety pop valve, a valve body, a valve seat and a valve seat bushing between said seat and said body carrying the valve seat at one end, said valve seat bushing being unyielding to valve spring pressure and having relatively yielding and unyielding or reinforced sections adapted to prevent distortions of the valve body from being transmitted to the valve seat.

2. In a safety pop valve, a valve body, a valve seat, and a tubular connection carrying the valve seat at one end and connected to the valve body at the other end, said tubular connection being unyielding to valve spring pressure and comprising relatively yielding and unyielding or reinforced sections adapted to prevent distortions of the valve body from being transmitted to the valve seat.

3. In a safety pop valve, a valve body, a valve seat, and a valve seat bushing between said seat and said body carrying the valve seat at one end, said valve seat bushing being unyielding to valve spring pressure and having a relatively unyielding or reinforced section and relatively yielding sections on each side thereof, said sections adapted to prevent distortions of the valve body from being transmitted to the valve seat.

4. In a safety pop valve, a valve body, a valve seat and a valve seat bushing between said seat and said body carrying the valve seat at one end, said valve seat bushing being interiorly cylindrical and having circumferential sections of relatively greater and smaller cross sectional area, said sections adapted to prevent distortions of the valve body from being transmitted to the valve seat.

Signed by us at Bridgeport, Connecticut, this eleventh day of August 1914.

FREDERICK C. BLANCHARD.
ERNEST B. CROCKER.

Witnesses:
EUGENE M. MOORE,
JOSEPH H. LEDERER.